United States Patent
Koike

(10) Patent No.: US 10,496,354 B2
(45) Date of Patent: Dec. 3, 2019

(54) TERMINAL DEVICE, SCREEN SHARING METHOD, AND SCREEN SHARING SYSTEM

(71) Applicant: Hiromasa Koike, Tokyo (JP)

(72) Inventor: Hiromasa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 282 days.

(21) Appl. No.: 15/027,281

(22) PCT Filed: Oct. 8, 2014

(86) PCT No.: PCT/JP2014/077476
§ 371 (c)(1),
(2) Date: Apr. 5, 2016

(87) PCT Pub. No.: WO2015/079818
PCT Pub. Date: Jun. 4, 2015

(65) Prior Publication Data
US 2016/0253143 A1    Sep. 1, 2016

(30) Foreign Application Priority Data
Nov. 27, 2013   (JP) ................. 2013-244633

(51) Int. Cl.
*G06F 13/00* (2006.01)
*G06F 3/048* (2013.01)
(Continued)

(52) U.S. Cl.
CPC .......... *G06F 3/1454* (2013.01); *G06F 3/0484* (2013.01); *G09G 5/12* (2013.01);
(Continued)

(58) Field of Classification Search
CPC ........ G06F 15/17306; G06F 17/30873; G06Q 10/10
See application file for complete search history.

(56) References Cited

U.S. PATENT DOCUMENTS 5,012,509 A    4/1991  Nakamura et al.
8,458,283 B1 *  6/2013  Chapweske ........ H04N 1/00204
                                                    709/213
(Continued)

FOREIGN PATENT DOCUMENTS

JP     H02-170690    7/1990
JP     2000-092217   3/2000
(Continued)

OTHER PUBLICATIONS

International Search Report dated Jan. 6, 2015 in PCT/JP2014/077476 filed on Oct. 8, 2014.
Extended European Search Report dated Aug. 12, 2016.

*Primary Examiner* — Jordany Nunez
(74) *Attorney, Agent, or Firm* — IPUSA, PLLC

(57) ABSTRACT

A terminal device shares a screen with other terminal devices via an information processing device. The terminal device acquires data necessary for screen display from an acquisition destination, and stores the acquired data in a storage unit, before receiving a request to share a screen from a user; sends the user's request to the information processing device, and acquires information necessary for sharing a screen from the information processing device; determines whether data necessary for screen display based on the request has been acquired, based on identification information of data necessary for screen display included in the information necessary for sharing the screen and identification information of data necessary for screen display stored in the storage unit; and starts to share the screen with the other terminal devices by using the data stored in the storage unit, when the data is determined to have been acquired.

17 Claims, 17 Drawing Sheets

(51) Int. Cl.
*G06F 17/30* (2006.01)
*G06F 15/16* (2006.01)
*G06F 3/14* (2006.01)
*G06F 3/0484* (2013.01)
*G09G 5/12* (2006.01)
*H04L 29/06* (2006.01)

(52) U.S. Cl.
CPC ........ *H04L 63/0876* (2013.01); *H04L 65/403* (2013.01); *G09G 2370/025* (2013.01)

(56) References Cited

U.S. PATENT DOCUMENTS

| | | | |
|---|---|---|---|
| 8,743,022 | B2 | 6/2014 | Masuda et al. |
| 9,098,230 | B2 | 8/2015 | Masuda et al. |
| 2004/0183896 | A1 | 9/2004 | Takamine et al. |
| 2005/0144186 | A1* | 6/2005 | Hesselink ............... H04L 67/06 |
| 2007/0061889 | A1 | 3/2007 | Sainaney |
| 2008/0016155 | A1* | 1/2008 | Khalatian ............... G06F 3/038 |
| | | | 709/204 |
| 2011/0289157 | A1* | 11/2011 | Pirnazar ............ G06F 17/30873 |
| | | | 709/206 |
| 2014/0018053 | A1* | 1/2014 | Cho ...................... G06F 3/0488 |
| | | | 455/418 |
| 2014/0074930 | A1 | 3/2014 | Kumashio |
| 2017/0249394 | A1* | 8/2017 | Loeb ................... H04L 12/1822 |

FOREIGN PATENT DOCUMENTS

| | | |
|---|---|---|
| JP | 2002-259315 | 9/2002 |
| JP | 2004-259263 | 9/2004 |
| JP | 2006-268626 | 10/2006 |
| JP | 2009-508240 | 2/2009 |
| JP | 2011-048746 | 3/2011 |
| JP | 2012-085008 | 4/2012 |
| JP | 2012-089092 | 5/2012 |
| JP | 2012-108872 | 6/2012 |

* cited by examiner

FIG. 7

NEW CONFERENCE REGISTRATION

● PLEASE INPUT INFORMATION OF CONFERENCE TO BE REGISTERED INFORMATION

NAME OF CONFERENCE: BOARD MEETING
START DATE: 2013/10/10  13:00
HOST PASSWORD: ........  RE-ENTER: ........
PARTICIPATION PASSWORD: ........  RE-ENTER: ........

MATERIAL
MATERIAL NAME: OVERVIEW OF 2013 BUDGET  CHANGE  DELETE

ADD

SAVE

| CONFERENCE ID | NAME | START DATE | CONFERENCE STATE | HOST PASSWORD | PARTICIPATION PASSWORD | MATERIAL ID |
|---|---|---|---|---|---|---|
| M01 | BOARD MEETING | 2013/10/10 13:00 | DURING CONFERENCE | PASS_XXXX | PASS_YYYY | |
| M02 | PRODUCT A RELEASE PERMISSION CONFERENCE | 2013/10/10 14:00 | BEFORE CONFERENCE | AAAA | NONE | |
| M03 | PRODUCT B SALES PERSON MONTHLY MEETING | 2013/10/12 09:30 | BEFORE CONFERENCE | NONE | NONE | |
| M04 | T DIVISION STRATEGY BRIEFING | 2013/10/15 15:00 | BEFORE CONFERENCE | TTTT | NONE | |
| ...... | ...... | ...... | | | ...... | ...... |

| MATERIAL ID | URL (DOWNLOAD DESTINATION) | MATERIAL NAME | CONFERENCE ID |
|---|---|---|---|
| D001 | http://xxxx/D001 | 001.pdf | XXXX-XXXXXX |
| D002 | http://xxxx/D002 | 002.pdf | XXXX-XXXXXX |
| D003 | http://xxxx/D003 | 003.pdf | XXXX-XXXXXX |

FIG.11

| META-INFORMATION | RELEVANT APPLICATION INFORMATION |
| | MATERIAL IDENTIFIER (MATERIAL ID) |
| | etc··· |
| MAIN BODY | CONTENTS INFORMATION |

FIG.13

```
CONFERENCE LIST ×

CONFERENCE MANAGEMENT / CONFERENCE LIST

● A CONFERENCE SATISFYING SPECIFIED CONDITIONS
  CAN BE SEARCHED
SEARCH CONDITION

CONFERENCE ID
/ CONFERENCE NAME  [          ]

START DATE         [          ]  [PREVIOUS DAY] [NEXT DAY]

CONFERENCE STATE  ●ALL  ○DURING       ○NOT YET  ○NOT POSSIBLE
                         CONFERENCE     HOSTED     TO HOST

SEARCH RESULT
CONFERENCE  CONFERENCE NAME              START DATE         CONFERENCE
ID                                                          STATE
M01         BOARD MEETING                2013/10/10 13:00   DURING CONFERENCE
M02         PRODUCT A RELEASE            2013/10/10 14:00   BEFORE CONFERENCE
            PERMISSION CONFERENCE
M03         PRODUCT B SALES PERSON       2013/10/12 09:30   BEFORE CONFERENCE
            MONTHLY MEETING
M04         T DIVISION STRATEGY BRIEFING 2013/10/25 15:00   BEFORE CONFERENCE
 :          :                            :                  :
 :          :                            :                  :
 :          :                            :                  :

[CONFERENCE] [PARTICIPATE]     ◁◁PREVIOUS  1-8/8  ▷▷NEXT
[ DETAILS  ]                      10 ITEMS         10 ITEMS
```

FIG.17

| TYPE OF MESSAGE | DATA FORMAT |
|---|---|
| SPECIFY DISPLAY PAGE | `<message type="groupchat", from="XXXX", to="YYYY">`<br>`<body>`<br>`<conference operation="update">`<br>    `2`<br>`</conference>`<br>`</body>`<br>`</message>` |
| ADD FIGURE | `<message type="groupchat", from="XXXX", to="YYYY">`<br>`<body>`<br>`<conference operation="add">`<br>    `<autoshape id="as1" x=100 y=100>`<br>        `<svg>`<br>          ....<br>        `</svg>`<br>    `</autoshape>`<br>`</conference>`<br>`</message>` |
| DELETE FIGURE | `<message type="groupchat", from="XXXX", to="YYYY">`<br>`<body>`<br>`<conference operation="delete">`<br>    `<autoshape id="as1"></autoshape>`<br>`</conference>`<br>`</message>` |
| UPDATE HANDWRITTEN MEMO | `<message type="groupchat", from="XXXX", to="YYYY">`<br>`<body>`<br>`<conference operation="update">`<br>    `<ink>`<br>      ....<br>    `</ink>`<br>`</conference>`<br>`</body>`<br>`</message>` |

TERMINAL DEVICE, SCREEN SHARING METHOD, AND SCREEN SHARING SYSTEM

TECHNICAL FIELD

The present invention relates to a terminal device, a screen sharing method, and a screen sharing system.

BACKGROUND ART

There is conventionally known a screen sharing service providing system, in which display contents are shared in advance among information processing devices, and only the operation information of the input operation received at each information processing device is exchanged, so that a display screen, in which input operations are applied by a small amount of data, can be shared (see, for example, Patent Document 1).

In a conventional screen sharing service providing system, the sharing of the display screen begins after the respective information processing devices acquire the display contents. However, in the conventional screen sharing service providing system, the display contents are acquired when starting to use the screen sharing service, and therefore there has been a problem in that it takes time until the sharing of the display screen starts.

Patent Document 1: Japanese Laid-Open Patent Application No. 2012-108872

DISCLOSURE OF INVENTION

According to one aspect, a terminal device shares a screen with one or more other terminal devices via an information processing device. The terminal device includes a data acquisition unit configured to acquire data necessary for screen display from an acquisition destination, and store the acquired data necessary for screen display in a storage unit, before receiving a screen share start request from a user; a start request unit configured to send the screen share start request received from the user to the information processing device, and acquire information necessary for sharing a screen from the information processing device; and a start process unit configured to determine whether data necessary for screen display based on the screen share start request has been acquired, based on identification information of data necessary for screen display included in the information necessary for sharing the screen and identification information of data necessary for screen display stored in the storage unit, and to start to share the screen with the one or more other terminal devices by using the data necessary for screen display stored in the storage unit, when data necessary for screen display is determined to have been acquired.

According to one aspect, a non-transitory computer-readable recording medium stores a program that causes a computer to execute a process in a terminal device that shares a screen with one or more other terminal devices via an information processing device. The process includes acquiring data necessary for screen display from an acquisition destination, and storing the acquired data necessary for screen display in a storage unit, before receiving a screen share start request from a user; sending the screen share start request received from the user to the information processing device, and acquiring information necessary for sharing a screen from the information processing device; and determining whether data necessary for screen display based on the screen share start request has been acquired, based on identification information of data necessary for screen display included in the information necessary for sharing the screen and identification information of data necessary for screen display stored in the storage unit, and starting to share the screen with the one or more other terminal devices by using the data necessary for screen display stored in the storage unit, when data necessary for screen display is determined to have been acquired.

According to one aspect, a screen sharing method is executed by a terminal device that shares a screen with one or more other terminal devices via an information processing device. The screen sharing method includes acquiring data necessary for screen display from an acquisition destination, and storing the acquired data necessary for screen display in a storage unit, before receiving a screen share start request from a user; sending the screen share start request received from the user to the information processing device, and acquiring information necessary for sharing a screen from the information processing device; and determining whether data necessary for screen display based on the screen share start request has been acquired, based on identification information of data necessary for screen display included in the information necessary for sharing the screen and identification information of data necessary for screen display stored in the storage unit, and starting to share the screen with the one or more other terminal devices by using the data necessary for screen display stored in the storage unit, when data necessary for screen display is determined to have been acquired.

According to one aspect, a screen sharing system includes an information processing device; an application installed in a plurality of terminal devices that share a screen via the information processing device; a data acquisition unit configured to acquire, by the application, data necessary for screen display from an acquisition destination, and store, by the application, the acquired data necessary for screen display in a storage unit, before receiving a screen share start request from the terminal device of a user; a start request unit configured to send, by the application, the screen share start request received from the user to the information processing device, and acquire, by the application, information necessary for sharing a screen from the information processing device; and a start process unit configured to determine, by the application, whether data necessary for screen display based on the screen share start request has been acquired, based on identification information of data necessary for screen display included in the information necessary for sharing the screen and identification information of data necessary for screen display stored in the storage unit, and to start to share the screen with other ones of the plurality of terminal devices, by the application, by using the data necessary for screen display stored in the storage unit, when data necessary for screen display is determined to have been acquired.

BRIEF DESCRIPTION OF DRAWINGS

FIG. 7 is an image diagram of an example of a conference registration screen;

FIG. 8 is a configuration diagram of an example of a conference information DB;

FIG. 9 is a configuration diagram of an example of a material information DB;

FIG. 11 is a configuration diagram of an example of conference material received by a preliminary acquisition process of the conference material;

FIG. 13 is an image diagram of an example of a conference participation screen;

FIG. 17 illustrates an example of an XMPP message.

Figure 1:
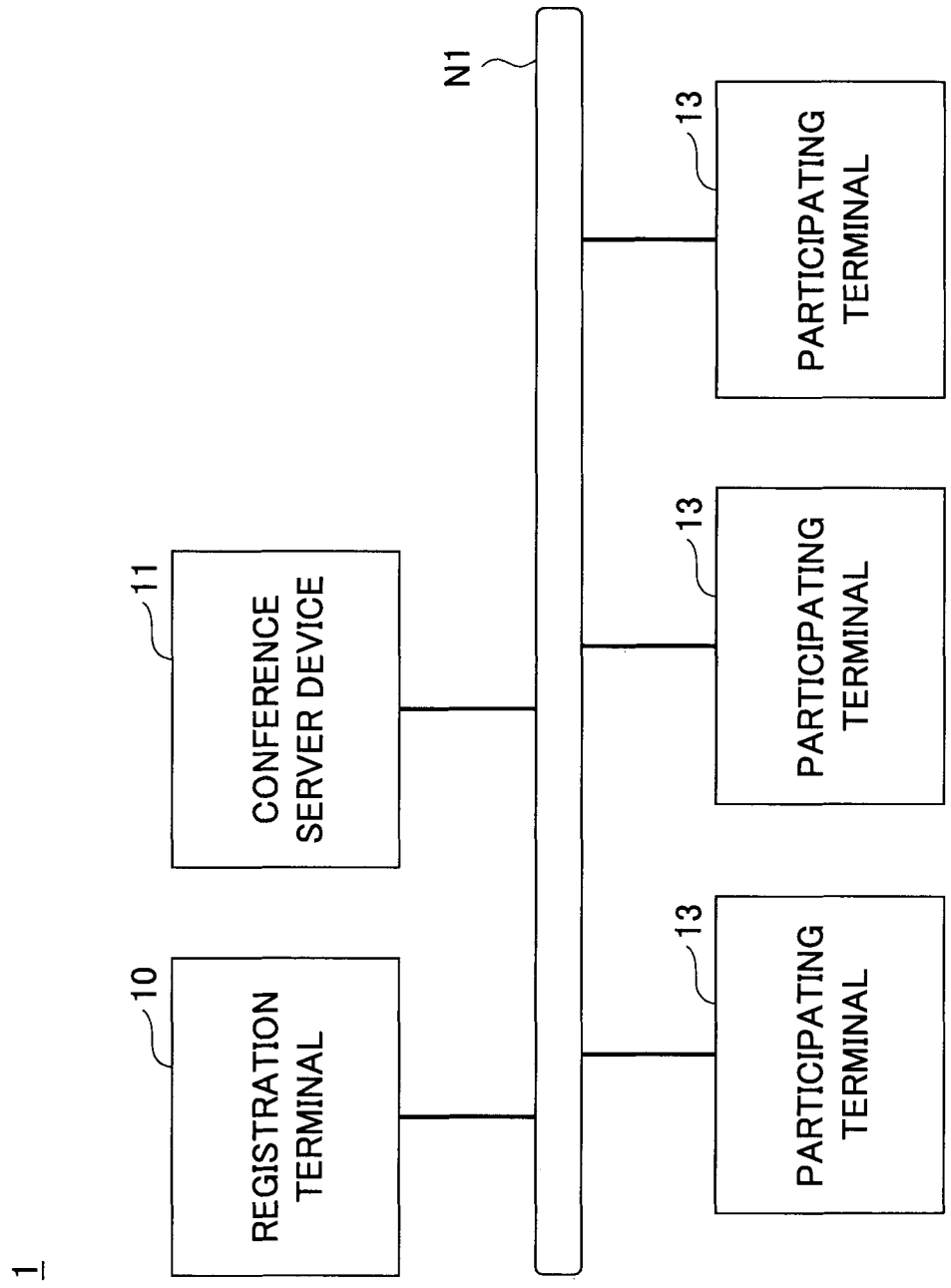
FIG. 1 is a configuration diagram of an example of a conference system according to the an embodiment.

DESCRIPTION OF THE REFERENCE NUMBERS 1 conference system
10 registration terminal
11 conference server device
13, 13a, 13b participating terminal
21 display control unit
22 operation receiving unit
23 registration request unit
31 screen transmission unit
32 registration process unit
33 material transmission unit
34 participation reception unit
35 conference control unit
36 conference information DB
37 material information DB
41 display control unit
42 operation receiving unit
43 material acquisition unit
44 participation request unit
45 participation processing unit
46 conference processing unit
47 material data storage unit
100 computer
101 input device
102 display device
103 external I/F
103a recording medium
104 RAM (Random Access Memory)
105 ROM (Read Only Memory)
106 CPU (Central Processing Unit)
107 communication I/F
108 HDD (Hard Disk Drive)
N1 network

BEST MODE FOR CARRYING OUT THE INVENTION

Embodiments of the present invention are described below with reference to the accompanying drawings. Note that in the present embodiment, a description is given of a conference system, as an example of a screen sharing system. In the conference system according to the present embodiment, the participating terminals acquire conference material from a conference server device, and share a display screen by using the conference material. The conference material is an example of information that starts to be shared after being acquired.

First Embodiment

System Configuration

FIG. 1 is a configuration diagram of an example of a conference system according to the present embodiment. An example of a conference system 1 of FIG. 1 includes a registration terminal 10, a conference server device 11, and a plurality of participating terminals 13, which are connected to a network N1 such as a LAN.

The registration terminal 10 includes a function for registering conference information and conference materials described below, in the conference server device 11. The host and the presenter of the conference can register the conference information and conference materials in the conference server device 11 from the registration terminal 10. The registration terminal 10 is a device that is operated by the host and the presenter of the conference. The registration terminal 10 may be a mobile information terminal such as a PC (personal computer), a tablet terminal, a smartphone, a mobile phone, or a PDA, or a terminal exclusively used for a conference. Furthermore, the registration terminal 10 may be an image forming apparatus such as a printer or a multifunction peripheral, or a projection device such as a projector.

The conference server device 11 manages the conference information and conference materials. Furthermore, the conference server device 11 has a function of hosting a conference, controlling the participation, and distributing, in a real-time manner, the input operations of a presenter to the participating terminals 13 participating in the conference. The conference server device 11 is realized by software and services operating in a single computer.

Furthermore, the conference server device 11 may be software and services operating in a plurality of computers. Furthermore, the conference server device 11 may have a configuration of a so-called cloud service. Note that the hardware of the conference server device 11 may be a terminal, as long as the conference server device 11 has a conference server function.

The participating terminal 13 has a function of acquiring conference information and conference materials from the conference server device 11, and participating in a conference. The presenter and the participants of the conference can participate in the conference from the participating terminals 13. The participating terminal 13 is a device that is operated by the presenter and the participant of the conference.

The participating terminal 13 may be a mobile information terminal such as a PC, a tablet terminal, a smartphone, a mobile phone, or a PDA, a display device such as an electronic whiteboard, a projection device such as a projector, or a terminal exclusively used for a conference. Furthermore, the participating terminal 13 may be an image forming apparatus such as a printer or a multifunction peripheral. While the participating terminal 13 is participating in a conference, the participating terminal 13 receives, in a real-time manner, input operations of the presenter from the conference server device 11, and shares a display screen with other participating terminals 13.

Hardware Configuration

Figure 2:
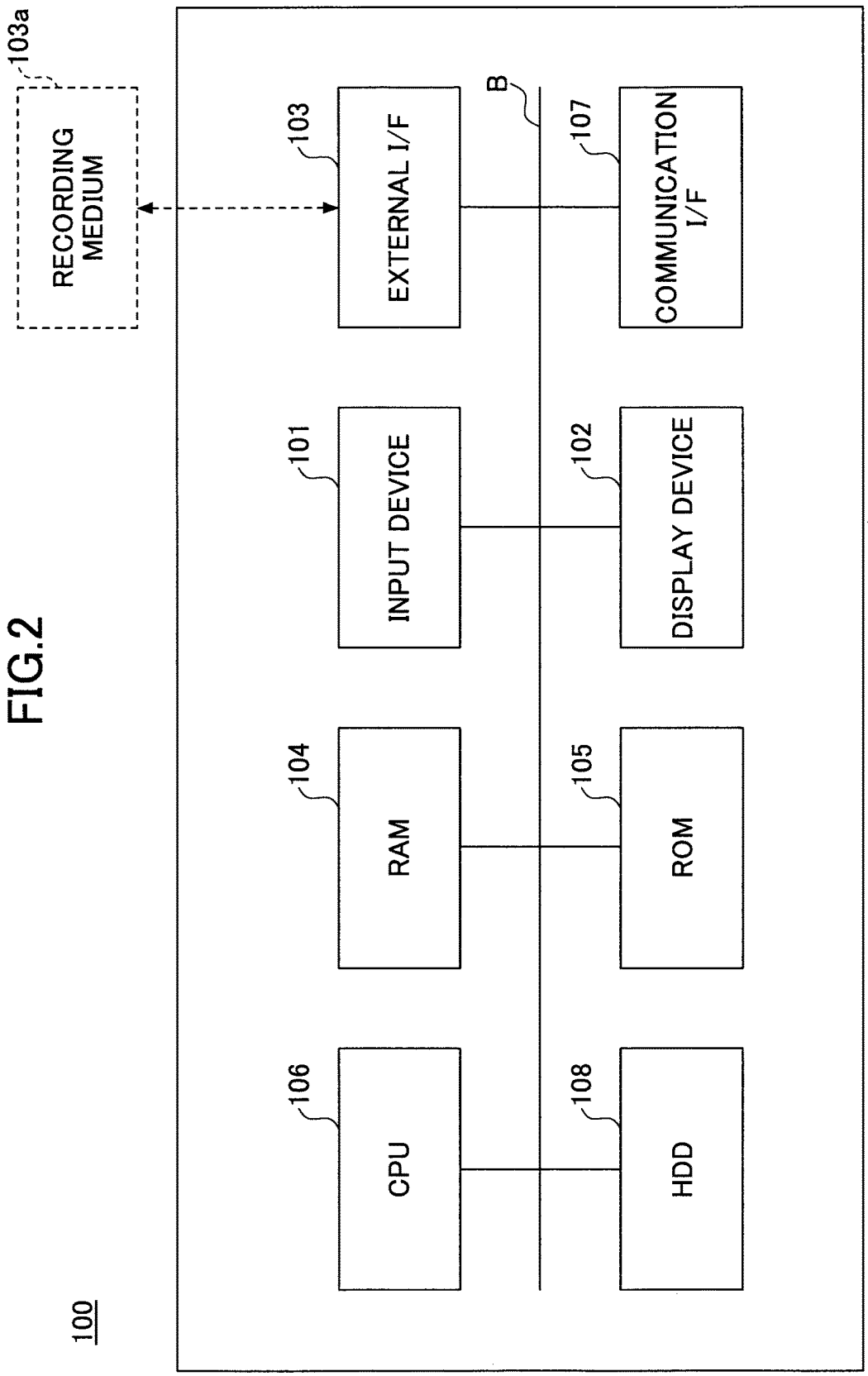
FIG. 2 is a hardware configuration diagram of an example of a computer according to the an embodiment.

The registration terminal 10, the conference server device 11, and the participating terminal 13 are realized by, for example, a computer 100 having a hardware configuration illustrated in FIG. 2. FIG. 2 is a hardware configuration diagram of an example of the computer 100 according to the present embodiment.

The computer 100 illustrated in FIG. 2 includes an input device 101, a display device 102, an external I/F 103, a RAM 104, a ROM 105, a CPU 106, a communication I/F 107, and a HDD 108, which are connected to each other by a bus B.

The input device 101 includes a keyboard and a mouse, and is used for inputting various operation signals to the computer 100. The display device 102 includes a display, and displays processing results obtained by the computer 100.

The communication I/F 107 is an interface for connecting the computer 100 to the network N1. Accordingly, the computer 100 can perform data communication with other computers 100 via the communication I/F 107.

The HDD 108 is a non-volatile storage device storing programs and data. The stored programs and data include an OS which is the basic software for controlling the entire computer 100, and application software for providing various functions on the OS.

The external I/F 103 is an interface between the computer 100 and an external device. The external device is, for example, a recording medium 103a. Accordingly, the computer 100 can perform reading and/or writing of data with respect to the recording medium 103a, via the external I/F 103. The recording medium 103a may be, for example, a flexible disk, a CD, a DVD, a SD memory card, and a USB memory.

The ROM 105 is a non-volatile semiconductor memory (storage device) that can store programs and data even after the power is turned off. The ROM 105 stores programs and data such as a BIOS that is executed when the computer 100 is activated, an OS setting, and a network setting. The RAM 104 is a volatile semiconductor memory for temporarily storing programs and data.

The CPU 106 is a processor that realizes the control and functions of the entire computer 100, by loading programs and data from storage devices such as the ROM 105 and the HDD 108 into the RAM 104, and executing processes. Note that the computer 100 may include configurations other than the hardware configuration illustrated in FIG. 2; for example, a camera, a microphone, and a speaker may be built in the computer 100.

The registration terminal 10, the conference server device 11, and the participating terminal 13 execute programs in the computer 100 having, for example, the above hardware configuration, to realize various processes as described below.

Software Configuration

The registration terminal 10, the conference server device 11, and the participating terminal 13 of the conference system 1 according to the present embodiment are realized by, for example, the following functional blocks.

Registration Terminal

Figure 3:
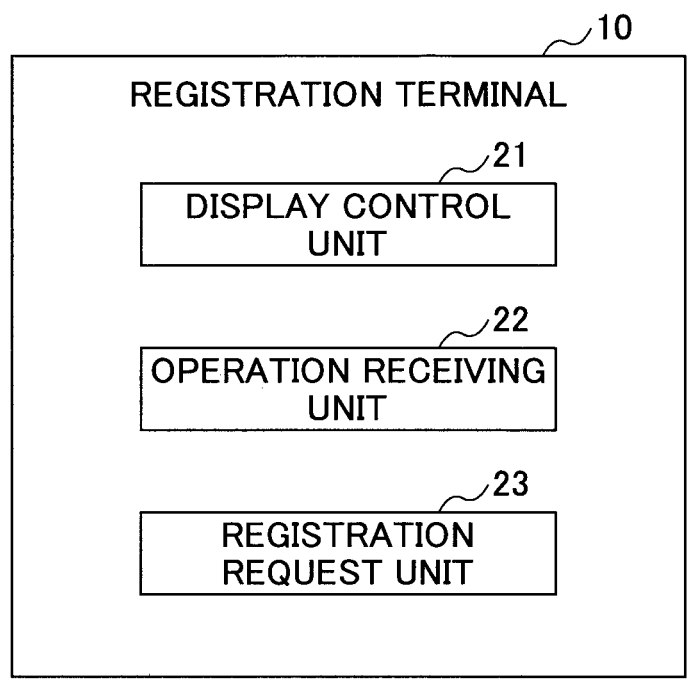
FIG. 3 is a functional block diagram of an example of a registration terminal.

The registration terminal 10 is realized by functional blocks as illustrated in FIG. 3. FIG. 3 is a functional block diagram of an example of the registration terminal 10. The registration terminal 10 realizes a display control unit 21, an operation receiving unit 22, and a registration request unit 23, by executing programs.

The display control unit 21 performs processes for displaying a conference registration screen described below, according to operations by the host and the presenter of the conference. The operation receiving unit 22 receives input of information of the conference such as conference information and conference materials, according to operations by the host and the presenter of the conference performed with respect to the conference registration screen. The registration request unit 23 makes a registration request to the conference server device 11, to register the information of the conference input to the conference registration screen, and registers the information of the conference in the conference server device 11.

Conference Server Device

Figure 4:
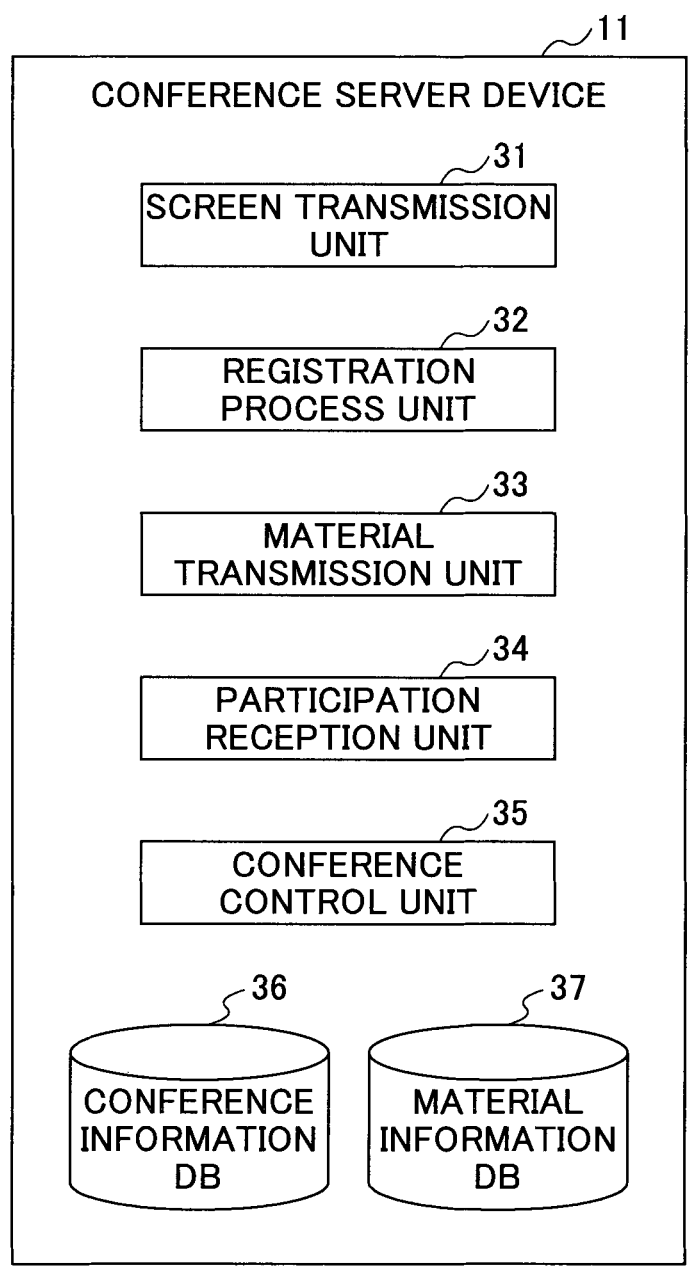
FIG. 4 is a functional block diagram of an example of a conference server device.

The conference server device 11 is realized by functional blocks as illustrated in FIG. 4. FIG. 4 is a functional block diagram of an example of the conference server device 11. The conference server device 11 realizes a screen transmission unit 31, a registration process unit 32, a material transmission unit 33, a participation reception unit 34, a conference control unit 35, a conference information DB 36, and a material information DB 37, by executing programs.

The screen transmission unit 31 sends the conference registration screen described below to the registration terminal 10, based on an access request from the registration terminal 10. The registration process unit 32 receives a registration request to register the information of the conference from the registration terminal 10, and registers the information of the conference in the conference information DB 36 or the material information DB 37.

The material transmission unit 33 sends the conference material to the participating terminal 13, based on a material acquisition request from the participating terminal 13. The participation reception unit 34 sends conference information of conferences that are hosted or conferences in which participation is possible, to the participating terminal 13, based on a conference information acquisition request from the participating terminal 13. Furthermore, the participation reception unit 34 sends in-conference information described below that is necessary for sharing the display screen, to the participating terminal 13, based on a participation request from the participating terminal 13. The conference control unit 35 receives an input operation from the participating terminal 13 of the presenter, and distributes the input operation of the presenter to the participating terminals 13 of the participants participating in the conference, to cause the participating terminals 13 participating in the conference share a display screen.

The conference information DB 36 stores conference information described below. Furthermore, the material information DB 37 stores the material information and material data described below, as conference material. Note that by recording the storage destination of the material data in the material information, the material data may be stored in a file server device other than the conference server device 11.

Participating Terminal

Figure 5:
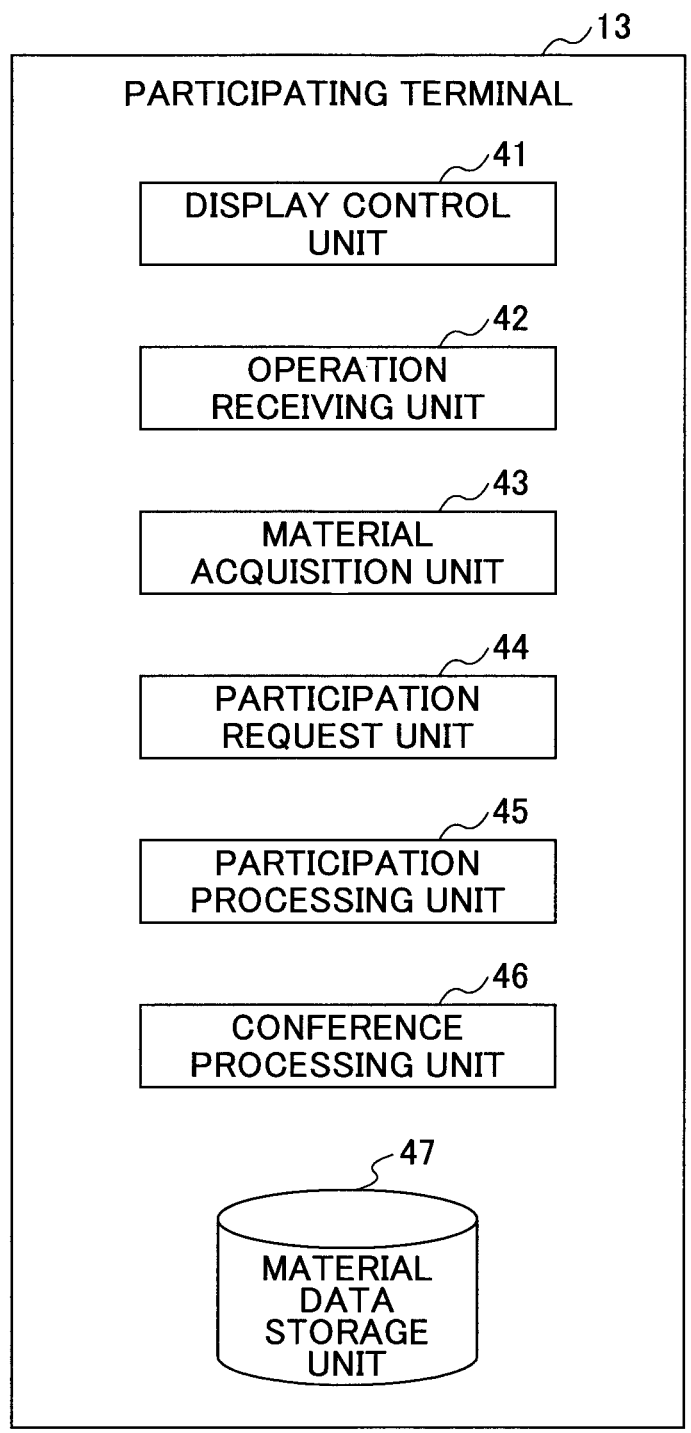
FIG. 5 is a functional block diagram of an example of a participating terminal.

The participating terminal 13 is realized by functional blocks as illustrated in FIG. 5. FIG. 5 is a functional block diagram of an example of the participating terminal 13. The participating terminal 13 realizes a display control unit 41, an operation receiving unit 42, a material acquisition unit 43, a participation request unit 44, a participation processing unit 45, a conference processing unit 46, and a material data storage unit 47, by executing programs. The programs executed at the participating terminal 13 are, for example, applications installed in the participating terminal 13.

The display control unit 41 performs processes of displaying a conference participation screen and a conference screen described below, according to operations by the presenter and the participant of the conference. The operation receiving unit 22 receives operations input to the conference participation screen and the conference screen, by the presenter and the participant. The material acquisition unit 43 makes a material acquisition request to the conference server device 11, and acquires conference material from the conference server device 11. The participation request unit 44 makes a conference information acquisition request to the conference server device 11, and acquires, from the conference server device 11, conference information of the conferences that are hosted or conferences in which participation is possible. Furthermore, the participation request unit 44 makes a request to participate in a conference to the conference server device 11, and receives, from the conference server device 11, in-conference information necessary for sharing the display screen.

The participation processing unit 45 performs a conference participation process described below, and when the material data of the conference to be participated in is already acquired in advance, the material data is used for displaying a conference screen. When the material data of the conference to be participated in is not acquired in advance, the participation processing unit 45 acquires the material data from the conference server device 11. The conference processing unit 46 shares the display screen by updating the conference screen, based on an input operation of the presenter distributed from the conference server device 11. The material data storage unit 47 stores the material data of the conference acquired in advance.

Details of Process

In the following, a description is given of details of the process of the conference system 1 according to the present embodiment.

Conference Registration Process

Figure 6:
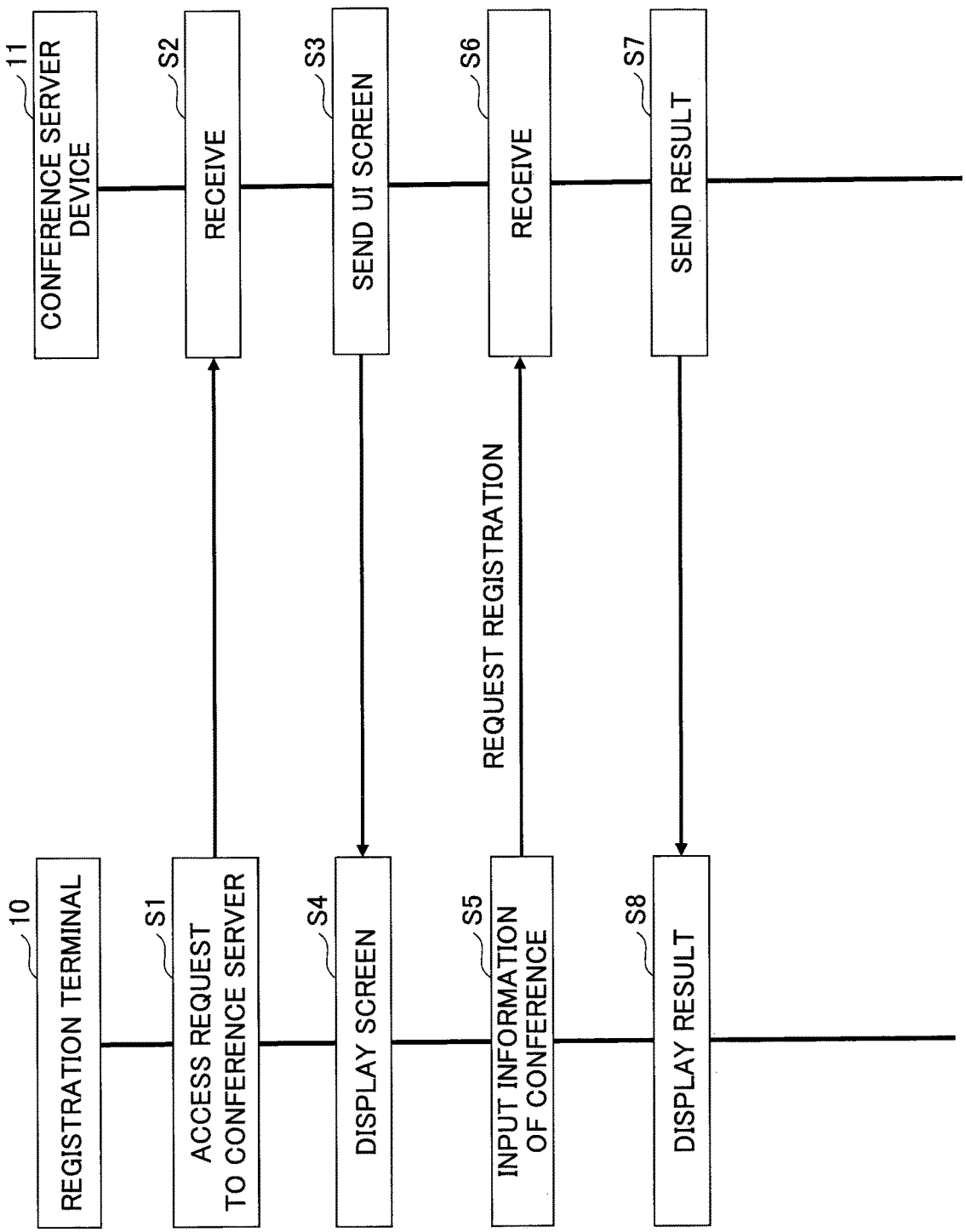
FIG. 6 is a flowchart of an example of a conference registration process.

FIG. 6 is a flowchart of an example of a conference registration process. The host or the presenter of the conference needs to register the information of the conference such as conference information and conference materials in the conference server device 11, before the conference takes place.

In step S1, the host or the presenter of the conference operates the registration terminal 10, and requests to access a conference registration screen of the conference server device 11. For example, the display control unit 21 of the registration terminal 10 accesses a URL of the conference registration screen of the conference server device 11.

In step S2, the screen transmission unit 31 of the conference server device 11 receives an access from the registration terminal 10. In step S3, the screen transmission unit 31 sends the conference registration screen data to the registration terminal 10.

In step S4, the display control unit 21 of the registration terminal 10 displays, for example, the conference registration screen of FIG. 7 on the display device 102, based on the conference registration screen data received from the conference server device 11.

FIG. 7 is an image diagram of an example of a conference registration screen. The conference registration screen is a screen for registering information of the conference such as conference information and conference materials. Note that the conference registration screen of FIG. 7 is an example including a field for inputting conference information such as the conference name, the start date, the host password, and the participation password, and a field for adding material data such as files as conference materials. In the field for adding material data such as files as conference materials, it is possible to register one or more conference materials in association with information of the conference.

Note that the conference registration screen may include a field for setting whether to allow the acquisition of material data in advance. In this case, when it is set to allow the acquisition of material data in advance, it is allowed to acquire material data in advance, as described below.

In step S5, the host or the presenter of the conference operates the registration terminal 10, inputs information of the conference in the conference registration screen, and presses a store button at the bottom of the conference registration screen. The operation receiving unit 22 of the registration terminal 10 receives the input of information of the conference such as the conference information and conference materials, according to an operation by the host or the presenter input to the conference registration screen. The registration request unit 23 of the registration terminal 10 makes a registration request to the conference server device 11, to register information of the conference input to the conference registration screen.

In step S6, the registration process unit 32 of the conference server device 11 receives a request to register information of the conference from the registration terminal 10, and registers the information of the conference in the conference information DB 36 or the material information DB 37. The registration process unit 32 receives the request to register information of the conference from the registration terminal 10, and registers the conference information included in the information of the conference in the conference information DB 36 as illustrated in FIG. 8.

Furthermore, the registration process unit 32 receives a request to register the conference information from the registration terminal 10, and registers the material information and the material data in the material information DB 37 as illustrated in FIG. 9, based on the conference material included in the information of the conference.

FIG. 8 is a configuration diagram of an example of the conference information DB 36. The conference information of FIG. 8 includes items such as a conference ID, a name, a start date, a conference state, a host password, a participation password, and a material ID. The conference ID is an example of identification information for uniquely identifying the conference. The name is the name of the conference. The conference state expresses the state of the conference, such as before the conference, during the conference, and after the conference. The host password is an example of authentication information necessary for hosting the conference. The participation password is an example of authentication information necessary for participating in the conference. The material ID is an example of identification information of conference material used in a conference.

FIG. 9 is a configuration diagram of an example of the material information DB 37. The material information of FIG. 9 includes items such as the material ID, the URL, the material name, and the conference ID. The material ID is an example of identification information for uniquely identifying the conference material. The URL is information of the download destination (store destination) of the material data. The material name is the name of the conference material. The conference ID is an example of identification information of the conference for using the conference material.

As illustrated in FIG. 8 and FIG. 9, the conference information and the material information are associated by a conference ID and a material ID. Therefore, the conference material used in a conference can be identified by the conference information and the material information.

Returning to step S7 of FIG. 6, the registration process unit 32 of the conference server device 11 sends the registration result of the information of the conference to the registration terminal 10. The display control unit 21 of the registration terminal 10 displays the registration result of the information of the conference received from the conference server device 11, and ends the conference registration process. Note that the registration result of the information of the conference may include the URL indicated in the material information of FIG. 9.

Accordingly, the host and the presenter of the conference who registered the information of the conference in the conference server device 11, can be aware of the URL for acquiring the material data in advance. Therefore, the host and the presenter of the conference can send, to the participants, a notification including a URL for acquiring the material data in advance. Note that a URL is one example, and may be any other kind of information (for example, a material ID) necessary for acquiring the material data.

Preliminary Acquisition Process of Conference Material

Figure 10:
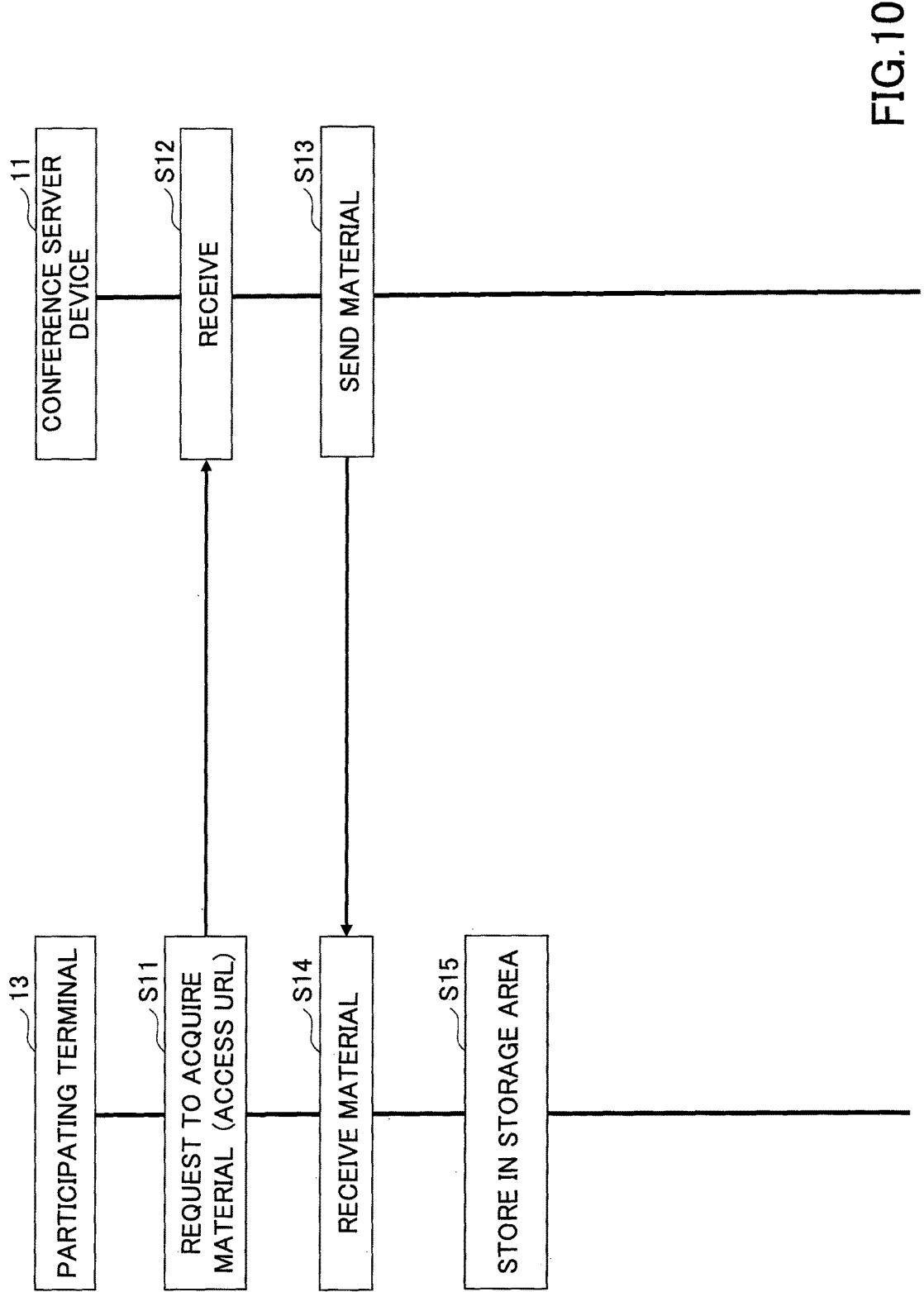
FIG. 10 is a flowchart of an example of a preliminary acquisition process of conference material.

FIG. 10 is a flowchart of an example of a preliminary acquisition process of conference material. The presenter and the participants of the conference can acquire the conference material in advance, before the conference starts. In this description, it is assumed that a notification including the information for acquiring material data in advance (for example, a URL) is sent to the presenter and the participants of the conference by e-mail.

In step S11, the presenter and the participants of the conference operate the participating terminal 13, and request to access the URL for acquiring the material data in advance of the conference server device 11. The material acquisition unit 43 of the participating terminal 13 makes a material acquisition request by accessing the URL for acquiring the material data in advance of the conference server device 11.

Note that when the information for acquiring the material data is a material ID, the participating terminal 13 first accesses the conference server device 11, and makes a material acquisition request including the material ID from the participating terminal 13 to the conference server device 11. In this case, the conference server device 11 identifies the conference material to be sent to the participating terminal 13, based on the material ID, instead of the URL.

In step S12, the material transmission unit 33 of the conference server device 11 receives a material acquisition request from the participating terminal 13. In step S13, the material transmission unit 33 sends the conference material to the participating terminal 13, based on a material acquisition request from the participating terminal 13. Note that when conference material is of a conference having a participation password set, for example, the conference material is sent to the participating terminal 13 when the validity is confirmed by the participation password.

In step S14, the material acquisition unit 43 of the participating terminal 13 receives the conference material from the conference server device 11, as a response to the material acquisition request. In step S15, the material acquisition unit 43 of the participating terminal 13 stores the received conference material (for example, material data such as a file) in a storage area in the participating terminal 13 such as the HDD 108, and ends the preliminary acquisition process of the conference material.

FIG. 11 is a configuration diagram of an example of conference material received by the preliminary acquisition process of the conference material. The conference material of FIG. 11 includes meta-information and a main body. The meta-information of the conference material includes a material ID, and therefore the participation processing unit 45 of the participating terminal 13 can determine whether the material data is of the conference to be participated in.

Furthermore, the meta-information of the conference material of FIG. 11 includes relevant application information. By using the relevant application information, the material acquisition unit 43 can store the conference material in a storage area the is exclusively used by an application identified by the relevant application information. For example, when the storage area exclusively used by an application is a storage area that cannot be referred to by another application, the other application cannot handle the conference material, and therefore the security performance is improved.

Even when the conference material is stored in a storage area other than the storage area exclusively used by an application, it is possible to improve the security performance by storing the conference material in a storage area by converting the data format into a data format that can only be handled by a particular application (data format for application), or by encrypting the data such that only a particular application can decrypt the data.

Conference Participation Process

Figure 12:
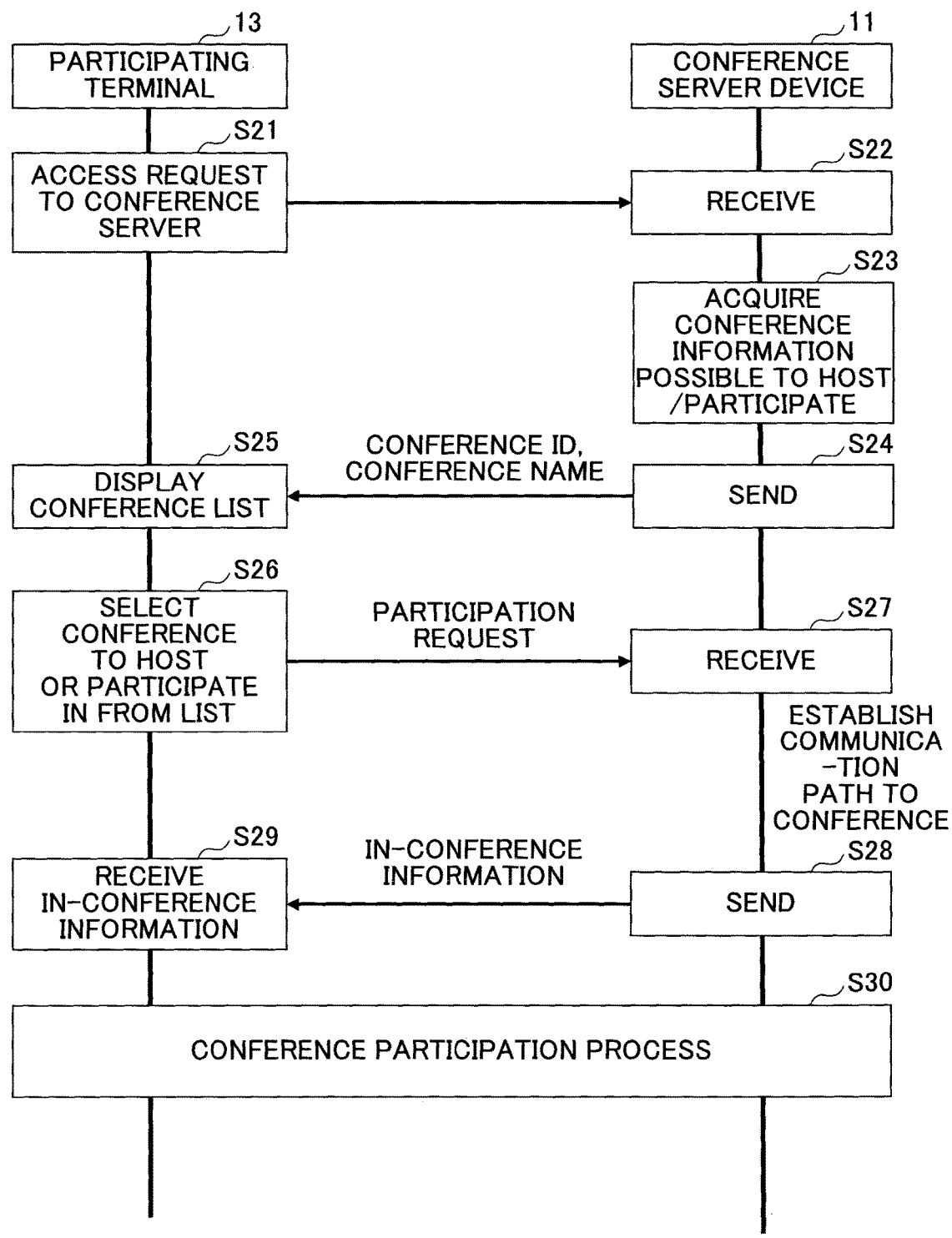
FIG. 12 is a flowchart of an example of a conference participation process.

FIG. 12 is a flowchart of an example of a conference participation process. The presenter and the participants of the conference operate the participating terminals 13, and request to access the conference participation screen of the conference server device 11. For example, the participation request unit 44 of the participating terminal 13 accesses the URL of the conference participation screen of the conference server device 11, to make a conference information acquisition request.

In step S22, the participation reception unit 34 of the conference server device 11 receives a conference information acquisition request from the participating terminal 13. In step S23, the participation reception unit 34 acquires, from the conference information DB 36, the conference information of the conferences that are hosted or conferences in which participation is possible, based on the conference information acquisition request from the participating terminal 13. Then, in step S24, the participation reception unit 34 sends, to the participating terminal 13, conference participation screen data including conference information of the conferences that are presently hosted or conferences in which participation is presently possible.

In step S25, the display control unit 21 of the participating terminal 13 displays, for example, a conference participation screen illustrated in FIG. 13 on the display device 102, based on the conference participation screen data received from the conference server device 11.

FIG. 13 is an image diagram of an example of a conference participation screen. The conference participation screen includes a conference list based on conference information of conferences that are hosted or conferences in which participation is possible. The conference participation screen of FIG. 13 displays a conference list of conferences of conference IDs "M01" through "M04".

In step S26, the presenter or the participant of the conference selects, from the conference list of the conference participation screen, a conference to be hosted or to be participated in, and presses a participation button at the bottom of the conference participation screen. The participation request unit 44 of the participating terminal 13 makes a participation request to the conference server device 11, to participate in the conference selected by the presenter or the participant of the conference in the conference participation screen.

In step S27, the participation reception unit 34 of the conference server device 11 establishes a communication path with the participating terminal 13, based on a participation request from the participating terminal 13. Subsequently, the conference server device 11 and the participating terminal 13 participating in the conference use the established communication path to exchange in-conference information necessary for sharing a display screen.

As described above, by the established communication path, the input operations from the participating terminal 13 of the presenter to the participating terminal 13 of the participant are distributed in a real-time manner via the conference server device 11, so that the screen is shared by the conference server device 11 and the participating terminal 13 participating in the conference. A typical example of such a communication path is a protocol referred to as XMPP.

XMPP is standardized by IETF as RFC3920 (Extensible Messaging and Presence Protocol: Core), RFC3921 (Extensible Messaging and Presence Protocol: Instant Messaging and Presence). Furthermore, an extended specification is documented as XEP.

XMPP can provide a service referred to as group chat (Multi-User Chat [XEP-0045]). Group chat is a function in which the participating terminal 13 participating in a conference room provided by XMPP sends a message to the conference server device 11, and the message is distributed from the conference server device 11 to all of the participating terminals 13 participating in the conference room. As such a communication path, protocols other than XMPP may be used, such as BOSH, which is an extension of XMPP, WebSocket, or Commet.

BOSH (Bidirectional-streams Over Synchronous HTTP) [XEP-0206] is a technology for transmitting/receiving messages by HTTP in XMPP. These protocols can realize a Push function from the conference server device 11. A Push function is not a function for sending information upon receiving a request from the participating terminal 13; Push is a function of sending information in an asynchronous manner from the conference server device 11 to the participating terminal 13 and receiving the information at the participating terminal 13. Note that in typical HTTP communication, it is also possible to realize a similar function by periodically acquiring information from the participating terminal 13.

In step S28, as a response to the participation request, the participation reception unit 34 of the conference server device 11 sends in-conference information necessary for sharing a display screen, to the participating terminal 13. The in-conference information necessary for sharing a display screen includes information of the conference material (material ID, URL, etc.), a page presently being displayed, and information of the presenter (user that is presently giving a presentation).

In step S29, the participation request unit 44 of the participating terminal 13 receives the in-conference information necessary for sharing a display screen. In step S30, the participation processing unit 45 of the participating terminal 13 performs a conference participation process based on the received in-conference information.

Figure 14:
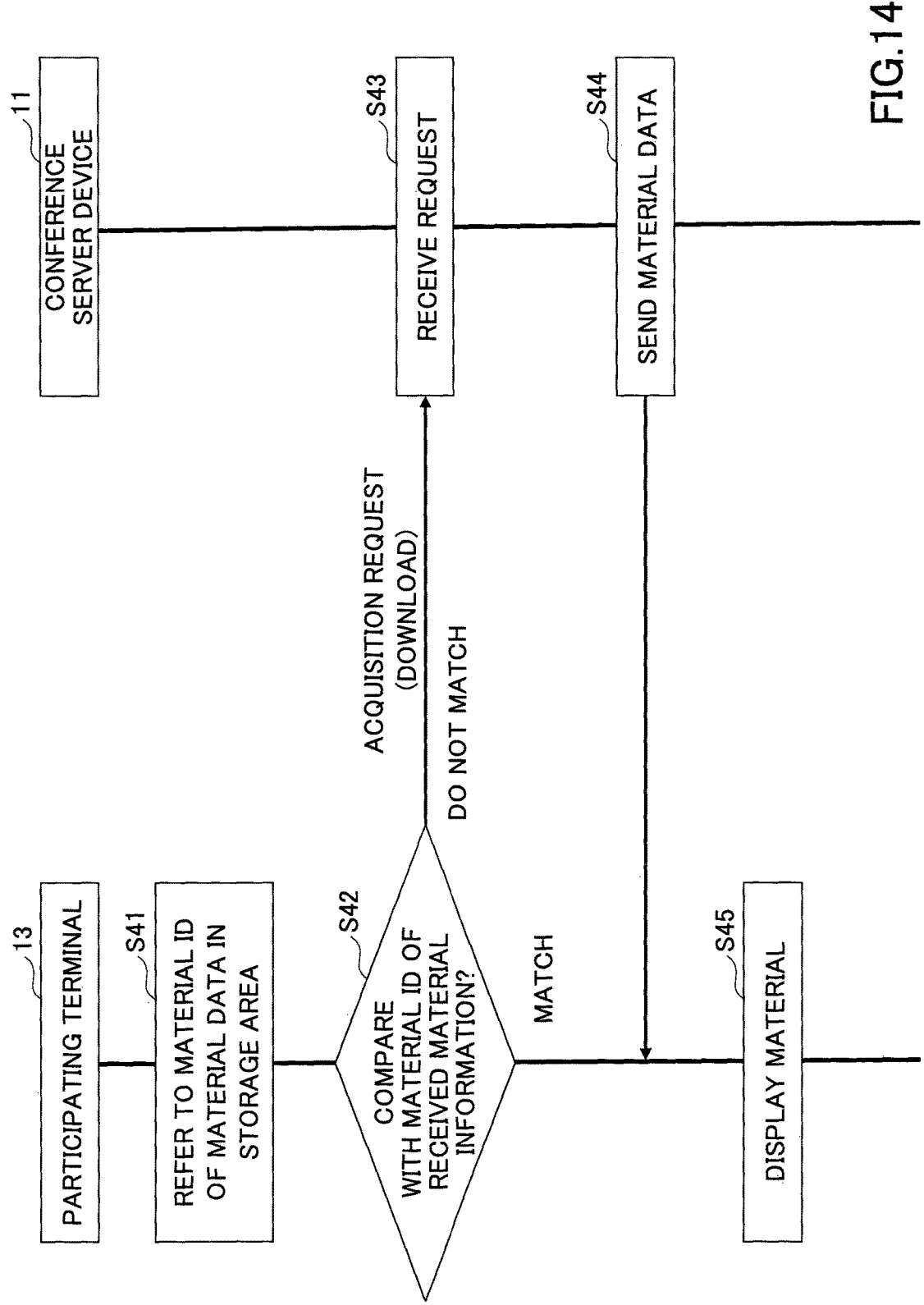
FIG. 14 is a flowchart of an example of a conference participation process.

FIG. 14 is a flowchart of an example of a conference participation process. In step S41, the participation processing unit 45 of the participating terminal 13 refers to the material ID included in the meta-information of the conference information (material data) of FIG. 11 stored in the storage area.

In step S42, the participation processing unit 45 compares the information (material ID) of the conference material included in the in-conference information received from the conference server device 11, with the material ID included in the meta-information of the material data referred to in step S41. Note that in the process of step S42, when information items of a plurality of conference materials are included in the in-conference information, the comparison with the material ID included in the meta-information of the material data referred to in step S41 is performed for each of the information items of conference materials included in the in-conference information.

When there is material data including, as meta-information, a material ID matching the material ID included in the in-conference information, the participation processing unit 45 determines that the material data of the conference to participate in is already acquired in advance. When the material data of the conference to be participated in is already acquired in advance, the participation processing unit 45 proceeds to step S45, and displays the material data determined as already acquired in a conference screen.

Meanwhile, when there is no material data including, as meta-information, a material ID matching the material ID included in the in-conference information, the participation processing unit 45 determines that the material data of the conference to participate in is not acquired in advance. When the material data of the conference to participate in is not acquired in advance, the material acquisition unit 43 sends a material acquisition request for acquiring the material data that is not yet acquired, to the conference server device 11.

In step S43, the material transmission unit 33 of the conference server device 11 receives the material acquisition request from the participating terminal 13. In step S44, the participating terminal 13 sends the material data to the participating terminal 13 based on the material acquisition request from the participating terminal 13. After step S44, the process proceeds to step S45, where the participation processing unit 45 of the participating terminal 13 displays the received material data in the conference screen.

As described above, by the conference system 1 according to the present embodiment, the material data of the conference to participate in is acquired in advance, and therefore the time from when the request to participate in the conference is made, until when the display screen starts to be shared, is reduced. Furthermore, by the conference system 1 according to the present embodiment, the communication amount for receiving the material data immediately after the conference starts, is significantly reduced. The extent of these effects become higher as the number of participating terminals 13 participating in the conference increases.

Conference Process

Figure 15:
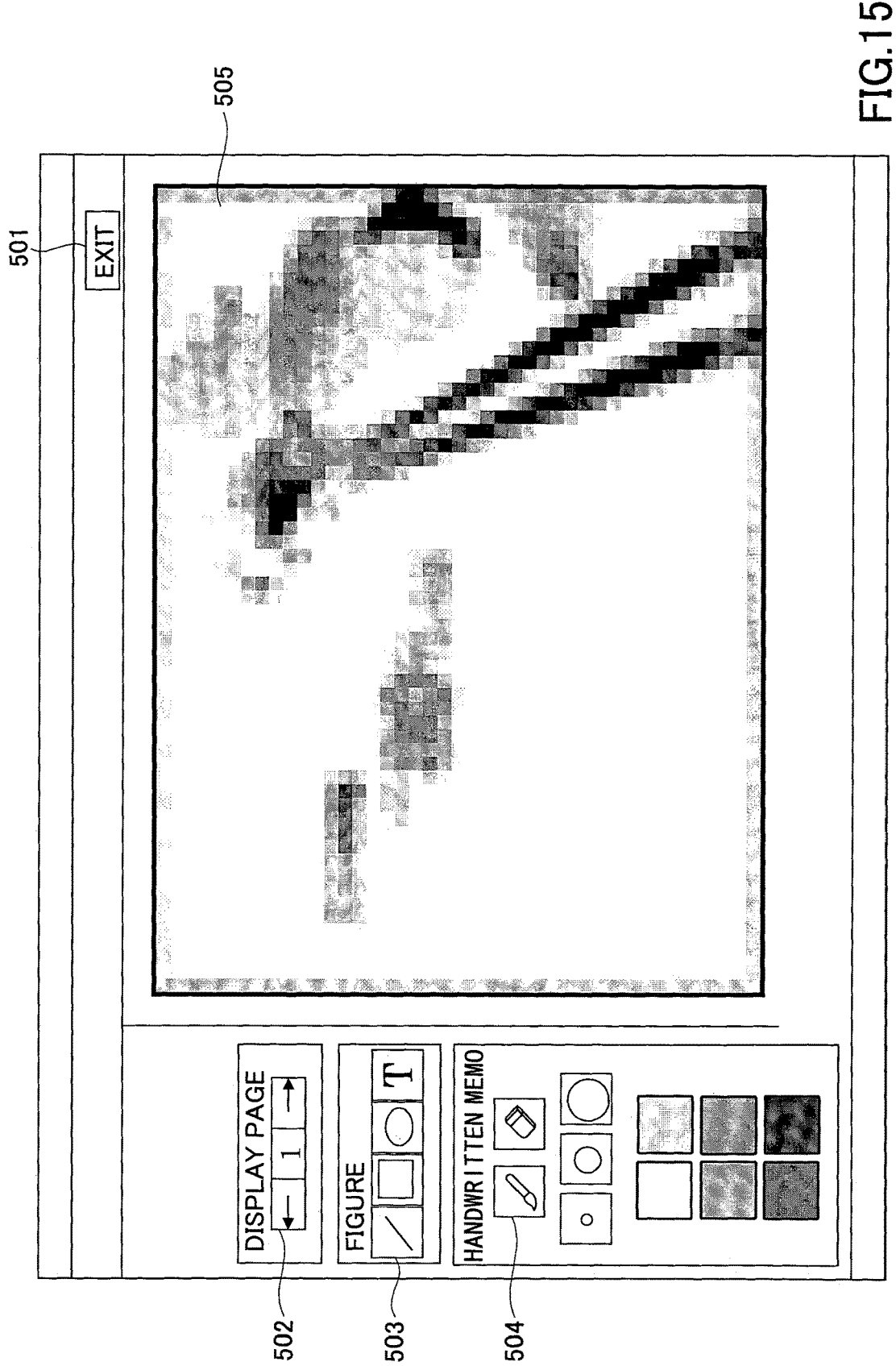
FIG. 15 is an image diagram of an example of a conference screen.

FIG. 15 is an image diagram of an example of a conference screen. The conference processing unit 46 of the participating terminal 13 receives input operations from users such as the presenter and participants from a conference screen as illustrated in FIG. 15.

By pressing an exit button 501 while the user is participating in the conference room, the user can exit from the conference room. When the exit button 501 is pressed, the conference processing unit 46 sends an XMPP message indicating that the user will exit from the conference room he/she is participating in, to the conference control unit 35 of the conference server device 11. The XMPP message indicating that the user will exit the conference room is in a standardized specification.

A selection field 502 is where the user selects a page of the conference material to be displayed. For example, when the user presses a right arrow button in the selection field 502, the conference processing unit 46 displays the next page of the conference material. When the user presses a left arrow button in the selection field 502, the conference processing unit 46 displays the previous page of the conference material. Then, the conference processing unit 46 generates an XMPP message specifying the display page, and sends the XMPP message to the conference control unit 35 of the conference server device 11.

A selection field 503 is where a figure to be added is selected. For example, the user presses a button in the selection field 503 indicating the figure that the user wants to add, clicks a display field 505 with a mouse, and touches the screen to instruct a starting point and an ending point, so that a figure is additionally displayed in the display field 505. The selection field 503 of FIG. 15 is provided with buttons indicating straight line, rectangle, oval, and text from the left as examples of figures to be added. Note that the instructions of the starting point and the ending point in the display field 505 may be given by different methods according to the device used by the user. For example, a mouse is used in the case of a PC, and the touching of a screen is used in the case of a tablet PC.

When a button indicating text is pressed, as an example of a figure to be added, the conference processing unit 46 prompts the user to select an area and then to input a text. According to an operation by the user to add a figure, the conference processing unit 46 generates an XMPP message of adding a figure, and sends the XMPP message to the conference control unit 35 of the conference server device 11.

When deleting a figure that has been additionally displayed in the display field 505, the user displays a menu by long-pushing or right-clicking the figure. The user can delete a figure from the display field 505 by selecting delete from the menu. When a figure in the display field 505 is long-pushed or right-clicked, the conference processing unit 46 displays a menu.

When the user selects delete from the menu, the conference processing unit 46 deletes the figure being long-pushed or right-clicked, from the display field 505. Then, the conference processing unit 46 generates an XMPP message of deleting the figure, and sends the XMPP message to the conference control unit 35 of the conference server device 11.

A selection field 504 is where the addition or the deletion of a handwritten memo is selected. For example, the user can select brush, eraser, brush size, or brush color, by pressing a button in the selection field 504 indicating brush, eraser, brush size, or brush color. As one example, the selection field 504 of FIG. 15 is provided with two buttons indicating brush and eraser in the top stage, three buttons indicating brush size in the middle stage, and six buttons indicating brush color in the bottom stage.

After selecting the brush, the brush size, and the brush color, the user presses a button of the mouse or touches the screen at a position in the display field 505, and moves the position while pressing the button or touching the screen, so that the user can render a handwritten memo in the display field 505.

The conference processing unit 46 records the coordinates of the trajectory of the user at certain sampling intervals, and connects the coordinates with straight lines, to render a single trace of a handwritten memo. Furthermore, the conference processing unit 46 generates an XMPP message of updating the handwritten memo, and sends the XMPP message to the conference control unit 35 of the conference server device 11.

Furthermore, the user can delete one of the traces of the handwritten memo in the display field 505, by pressing a button indicating eraser in the selection field 504, and then tracing the trace in a manner as to cut across the trace.

The conference processing unit 46 deletes the trace from the display field 505, according to an operation by the user of tracing one of the traces of the handwritten memo in the display field 505 in a manner as to cut across the trace. The conference processing unit 46 generates an XMPP message of deleting one of the traces in the handwritten memo, and sends the XMPP message to the conference control unit 35 of the conference server device 11.

Figure 16:
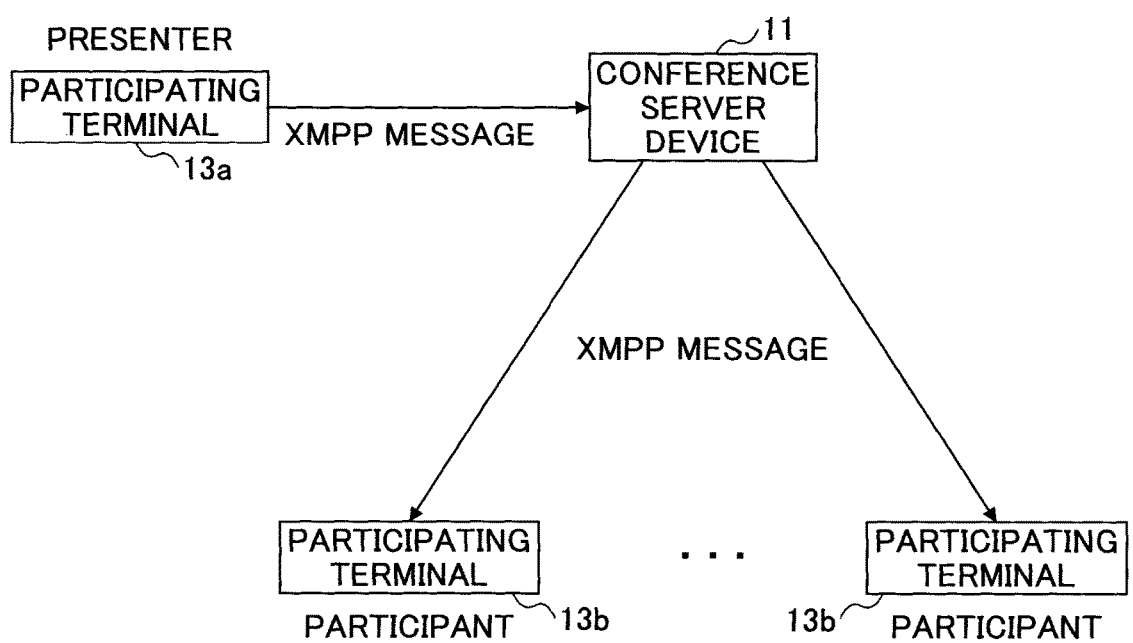
FIG. 16 is an image diagram of an example expressing how an XMPP message is distributed.

The XMPP message, which is sent from the conference processing unit 46 of the participating terminal 13a of the presenter to the conference control unit 35 of the conference server device 11, is distributed to the conference processing unit 46 of the participating terminals 13b of the participants, as illustrated in FIG. 16. FIG. 16 is an image diagram of an example expressing how an XMPP message is distributed.

As illustrated in FIG. 16, the XMPP message corresponding to an input operation of the presenter, which is sent from the participating terminal 13a of the presenter to the conference server device 11, is distributed, by the conference server device 11, to the participating terminals 13b of the participants participating in the conference. The conference processing unit 46 of the participating terminal 13b of the participant updates the conference screen according to the XMPP message corresponding to an input operation of the presenter distributed from the conference server device 11, so that the display screen can be shared with the participating terminal 13a of the presenter.

FIG. 17 illustrates an example of an XMPP message. FIG. 17 illustrates data formats of a display page specification message, a figure addition message, a figure deletion message, and a handwritten memo update message, as examples of an XMPP message.

The group chat by XMPP is performed in units of conference rooms. In group chat, when sending an XMPP message, as described below, groupchat is specified as the type attribute of the message tag. Furthermore, the sender is specified as the from attribute. The conference room is specified as the to attribute. The content of the message is specified as the body attribute.

Note that the message tag is in a standardized specification, and therefore detailed descriptions are omitted. In the conference system 1 according to the present embodiment, in order to synchronize the display of the displayed page of the conference material, a figure, and a handwritten memo, among the participating terminals 13, XML data defined at the conference system 1 is embedded in the body tag of the XMPP message.

In the XML data, a conference tag is used as the route element, and in operation attributes for adding additional information to the route element, values such as update, add, and delete are specified.

In a display page specification message, when the material used in a conference (conference material) includes a plurality of pages, in order to share the display page among the participating terminals 13, the display page is specified by a page tag.

In a figure add message, in order to share a figure added at a certain participating terminal 13 among the participating terminals 13, the figure data is specified by an autoshape tag. As the id attribute of the autoshape tag, the identifier of the figure is indicated. As the x and y attributes, the position (for example, coordinates) of the top left of the figure is indicated. The contents of the autoshape tag defines a figure by using SVG (Scalable Vector Graphics) data.

Furthermore, a figure delete message is for deleting a figure. The value of an operation attribute is specified by delete, and the autoshape tag of the deletion target is specified. In this case, the deletion target is determined by an id attribute of the autoshape tag.

Furthermore, in a handwritten memo update message, in order to share a handwritten memo added at a certain participating terminal 13 among the participating terminals 13, the handwritten memo data is specified by an ink tag. The ink tag is in a format defied by InkML. InkML is for describing the handwritten data by XML data, and the specification is recommended by W3C. It is assumed that the handwritten memo added to the conference material is expressed by one item of InkML data. When updating the handwritten memo, the value of the operation attribute is specified by update.

According to one embodiment of the present invention, the time until information starts to be shared can be reduced.

Overview

According to the present embodiment, the time from when a request to participate in the conference is made until the display screen starts to be shared can be reduced, compared to a method in which all participants receive the conference material from the conference server device 11 after the participants make a request to participate in the conference from the participating terminals 13. Furthermore, according to the present embodiment, it is possible to temporally distribute the communication amount, which is required for receiving the conference material, that temporarily arises immediately after the conference starts.

The terminal device, the screen sharing method, and the screen sharing system are not limited to the specific embodiments described herein, and variations and modifications may be made without departing from the scope of the present invention. For example, in the present embodiment, a conference system is indicated as an example of a screen sharing system; however, the present embodiment is also applicable to other systems for sharing information, such as a seminar system and an educational system.

For example, the conference server device 11 is an example of an information processing device. The participating terminal 13 is an example of a terminal device. The material acquisition unit 43 is an example of a data acquisition unit. The participation request unit 44 is an example of a start request unit. The participation processing unit 45 is an example of a start process unit. The conference processing unit 46 is an example of a share process unit. The request to participate in a conference is an example of a screen share start request. Furthermore, the conference material is an example of data necessary for screen display. The in-conference information is an example of information necessary for sharing a screen. The download destination (storage destination) of the material data is an example of an acquisition destination.

Note that the conference system 1 including the registration terminal 10, the conference server device 11, and the participating terminal 13 is one example; there may be various examples of system configurations according to the purposes and objectives.

The present application is based on and claims the benefit of priority of Japanese Priority Patent Application No. 2013-244633, filed on Nov. 27, 2013, the entire contents of which are hereby incorporated herein by reference.

The invention claimed is:

1. A terminal device that shares a screen, on which a material data item is displayed, with one or more other terminal devices of a user participating in a conference via an information processing device, the terminal device comprising:
   a processor; and
   a memory configured to store program instructions, wherein execution of the program instructions by the processor causes the processor to:
      acquire a first material data item associated with the conference from an acquisition destination in response to a user operation for acquiring the first material data item, the first material data item being identified by first identification information;
      store the acquired first material data item in association with the first identification information in the memory before sending a participation request to participate in the conference, the conference being selected by the user from a conference list;
      send the participation request for the selected conference to the information processing device;
      acquire second identification information from the information processing device, the second identification information identifying a second material data item associated with the conference stored at the acquisition destination; and
      compare the first identification information with the second identification information, wherein
         the processor starts sharing of the screen with the one or more other terminal devices by using the acquired first material data item stored in the memory in a case where the first identification information matches the second identification information; and
         the processor sends an acquisition request for acquiring the second material data item to the information processing device to acquire the second material data item from the acquisition destination, and uses the acquired second material data item to start sharing the screen with the one or more other terminal devices in a case where the first identification information does not match the second identification information.

2. The terminal device according to claim 1, wherein execution of the program instructions further causes the processor to:
   acquire the second material data item from the acquisition destination upon determining that the first material data item has not been acquired; and
   share the screen with the one or more other terminal devices by using the acquired second material data item after receiving a screen share start request from the user.

3. The terminal device according to claim 1, wherein execution of the program instructions further causes the processor to:
   receive, from the information processing device, contents of an input operation performed at one of the one or more other terminal devices after sharing of the screen has started with the one or more other terminal devices; and update the screen shared with the one or more other terminal devices based on the received contents of the input operation.

4. The terminal device according to claim 1, wherein execution of the program instructions further causes the processor to:
read the first identification information associated with the first material data item stored in the memory; and
determine whether the first material data item based on the screen share start request has been acquired.

5. The terminal device according to claim 1, wherein execution of the program instructions further causes the processor to:
read relevant application information from the first material data item; and
store the first material data item in a storage area exclusively used for an application that is identified by the relevant application information.

6. The terminal device according to claim 1, wherein execution of the program instructions further causes the processor to:
read relevant application information from the first material data item; and
store the first material data item in the memory upon converting the acquired first material data item into a data format for the application identified by the relevant application information.

7. The terminal device according to claim 1, wherein execution of the program instructions further causes the processor to:
receive, from the user, an acquisition request to acquire the first material data item together with authentication information necessary for sharing the screen with the one or more other terminal devices;
acquire the first material data item from the acquisition destination; and
store the first material data item in the memory, upon confirming validity of the authentication information.

8. The terminal device according to claim 1, wherein execution of the program instructions further causes the processor to:
determine whether each first material data item of a plurality of first material data items based on a screen share start request has been acquired; and
acquire the second material data item from the acquisition destination for the each first material data item from among the plurality of first material data items that the processor determines has not been acquired.

9. A screen sharing method executed by a terminal device that shares a screen, on which a material data item is displayed, with one or more other terminal devices of a user participating in a conference via an information processing device, the screen sharing method comprising:
acquiring a first material data item associated with the conference from an acquisition destination in response to a user operation for acquiring the first material data item, the first material data item being identified by first identification information;
storing the first material data item in association with the first identification information in a memory before sending a participation request to participate in the conference, the conference being selected by the user from a conference list;
sending the participation request for the selected conference to the information processing device;
acquiring second identification information from the information processing device, the second identification information identifying a second material data item associated with the conference stored at the acquisition destination;
comparing the first identification information with the second identification information;
starting sharing of the screen with the one or more other terminal devices by using the first material data item stored in the memory in a case where the first identification information matches the second identification information; and
sending an acquisition request for acquiring the second material data item to the information processing device to acquire the second material data item from the acquisition destination, and using the acquired second material data item to start sharing the screen with the one or more other terminal devices in a case where the first identification information does not match the second identification information.

10. A non-transitory computer-readable recording medium storing a program that causes a computer to execute a process for implementing the screen sharing method according to claim 9.

11. A screen sharing system comprising:
an information processing device; and
a plurality of terminal devices that share a screen, on which a material data item is displayed, of a user participating in a conference via the information processing device, and each terminal device of the plurality of terminal devices includes:
a processor; and
a memory configured to store an application, the application being installed in the memory of the each terminal device, and execution of the application by the processor causes the processor to:
acquire, by the application, a first material data item associated with the conference from an acquisition destination in response to a user operation of the terminal device for acquiring the first material data item, the first material data item being identified by first identification information;
store, by the application, the first material data item in association with the first identification information in the memory before sending a participation request to participate in the conference, the conference being selected by the user from a conference list;
send, by the application, the participation request for the selected conference to the information processing device;
acquire, by the application, second identification information from the information processing device, the second identification information identifying a second material data item associated with the conference stored at the acquisition destination; and
compare the first identification information with the second identification information, wherein
the processor starts sharing of the screen, by the application, with one or more other terminal devices from among the plurality of terminal devices by using the first material data item stored in the memory in a case where the first identification information matches the second identification information; and
the processor sends an acquisition request for acquiring the second material data item to the information processing device to acquire the second material data item from the acquisition destination, and uses the acquired second material data item to start sharing the screen with the one or more other terminal devices in a case where the first identification information does not match the second identification information.

12. The terminal device according to claim 1, wherein the execution of the program instructions further causes the processor to:
   determine whether the first material data item associated with the selected conference of the participation request has been acquired, the determining based on the second identification information acquired from the information processing device and the first identification information associated with the first material data item stored in the memory.

13. The terminal device according to claim 12, wherein the processor
   determines that the first material data item has been acquired in a case where the second identification information acquired from the information processing device matches the first identification information, and
   determines that the first material data item has not been acquired in a case where the second identification information acquired from the information processing device does not match the first identification information.

14. The screen sharing method according to claim 10, wherein the method further comprises:
   determining whether the first material data item associated with the selected conference of the participation request has been acquired, the determining based on the second identification information acquired from the information processing device and first identification information associated with the first material data item stored in the memory.

15. The screen sharing method according to claim 14, wherein
   it is determined that the first material data item has been acquired in a case where the second identification information acquired from the information processing apparatus matches the first identification information, and
   it is determined that the first material data item has not been acquired in a case where the second identification information acquired from the information processing apparatus does not match the first identification information.

16. The screen sharing system according to claim 11, wherein further execution of the application causes the processor to:
   determine whether the first material data item associated with the selected conference of the participation request has been acquired, the determining based on the second identification information acquired from the information processing device and the first identification information associated with the first material data item stored in the memory.

17. The screen sharing system according to claim 16, wherein the processor
   determines that the first material data item has been acquired in a case where the second identification information acquired from the information processing apparatus matches the first identification information, and
   determines that the first material data item has not been acquired in a case where the second identification information acquired from the information processing apparatus does not match the first identification information.

* * * * *